United States Patent
Fujioka

(10) Patent No.: US 7,274,979 B2
(45) Date of Patent: Sep. 25, 2007

(54) VEHICLE ANTI-THEFT DEVICE

(75) Inventor: Norihiro Fujioka, Fujisawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 99 days.

(21) Appl. No.: 10/552,564

(22) PCT Filed: Feb. 23, 2005

(86) PCT No.: PCT/JP2005/002844

§ 371 (c)(1),
(2), (4) Date: Oct. 11, 2005

(87) PCT Pub. No.: WO2005/080153

PCT Pub. Date: Sep. 1, 2005

(65) Prior Publication Data

US 2006/0206249 A1   Sep. 14, 2006

(30) Foreign Application Priority Data

Feb. 24, 2004   (JP) ............................. 2004-048249

(51) Int. Cl.
    *G06F 7/00* (2006.01)
(52) U.S. Cl. ...................... 701/36; 701/1; 340/426.11; 340/426.28
(58) Field of Classification Search .................. 701/1, 701/2, 36; 340/988, 426.14, 426.16, 426.28, 340/426.11, 426.13; 342/457
See application file for complete search history.

(56) References Cited

U.S. PATENT DOCUMENTS 6,028,537 A * 2/2000 Suman et al. ............... 340/988

FOREIGN PATENT DOCUMENTS

| JP | 64-016434 | 1/1989 |
|---|---|---|
| JP | 3086831 | 4/1991 |
| JP | 03-120256 | 5/1991 |
| JP | 10-167012 | 6/1998 |
| JP | 10-244853 | 9/1998 |
| JP | 10-315915 | 12/1998 |
| JP | 11-051177 | 2/1999 |
| JP | 2000-118357 | 4/2000 |
| JP | 2001-200666 | 7/2001 |

* cited by examiner

*Primary Examiner*—Gertrude A. Jeanglaude
(74) *Attorney, Agent, or Firm*—RatnerPrestia

(57) ABSTRACT

To prevent a vehicle from being stolen or improperly utilized when the registered user is not in the vicinity of the vehicle under the condition that its engine is in an idling state, an anti-theft apparatus according to the present invention comprises an immobilizer provided in the vehicle, and designed to control a gear shifter not to allow the gear shifter to be shifted from a neutral state or a parking state when the person is identified as the unregistered user under the condition that the vehicle is in the stopped state.

6 Claims, 4 Drawing Sheets

VEHICLE ANTI-THEFT DEVICE

THIS APPLICATION IS A U.S. NATIONAL PHASE APPLICATION OF PCT INTERNATIONAL APPLICATION PCT/JP2005/002844.

TECHNICAL FIELD OF THE INVENTION

The present invention relates to an anti-theft apparatus, and more particularly to an anti-theft apparatus for preventing a vehicle from being stolen or improperly utilized even if the vehicle is temporarily parked with its engine idling, and with no user.

DESCRIPTION OF THE RELATED ART

As one of anti-theft apparatuses described above, there is known an anti-theft apparatus which is shown in FIG. 4, and disclosed in, for example, a patent document 1 which is Patent Laid-Open Publication No. 2001-242501 (FIG. 1).

As shown in FIG. 4, the conventional anti-theft apparatus comprises an electronic key 4, in which user identification data is stored, the electronic key 4 having a transponder accommodated therein, and an immobilizer 1 provided in a vehicle. The user identification data stored in the electronic key 4 is indicative of a person demanding permission to utilize the vehicle. The immobilizer 1 stores user identification data which is indicative of a previously registered user having permission to utilize the vehicle. The immobilizer 1 includes a receiving unit 3 for receiving the user identification data from the electronic key 4 when the electronic key 4 is inserted in a slot of a key cylinder, and a controlling unit 2 for judging whether or not the person is identical to the registered user on the basis of the comparison between the user identification data received from the electronic key 4 and the user identification data indicative of the registered user.

The controlling unit 2 is adapted to output a permission signal to an engine controlling unit 5 when the judgment is made that the person is identical to the registered user. The engine controlling unit 5 is adapted to start an engine in response to the permission signal received from the controlling unit 2. On the other hand, the controlling unit 2 is adapted to output a rejection signal to the engine controlling unit 5 when the judgment is made that the person is not identical to the registered user. The engine controlling unit 5 is adapted to immobilize the engine in response to the rejection signal received from the controlling unit 2.

When the slot of the key cylinder has a mechanically replicated key received therein, the mechanically replicated key having key grooves the same as those of the real electronic key, the user identification data of the person demanding permission to utilize the vehicle is not compared with the user identification data of the registered user. The controlling unit 2 is adapted to judge that the vehicle is about to be improperly utilized when the user identification data of the person demanding permission to utilize the vehicle is not compared with the user identification data of the registered user. The engine controlling unit 5 is adapted to immobilize the engine when the judgment is made that the vehicle is about to be improperly utilized.

DISCLOSURE OF THE INVENTION

Problems to be Solved

The conventional anti-theft apparatus disclosed in the patent document 1 can prevent the engine from being improperly started by the mechanically replicated key. However, the conventional anti-theft apparatus encounters such a problem that the vehicle cannot be prevented from being stolen or improperly utilized when the vehicle is temporarily parked with its engine idling, and with no user.

It is, therefore, an object of the present invention to provide an anti-theft apparatus which can prevent the vehicle from being stolen or improperly utilized even if the vehicle is temporarily parked with its engine idling, and with no user.

Means of Solving the Problems

In accordance with the present invention, there is provided an anti-theft apparatus, comprising: memory media to be carried by a person demanding permission to utilize a vehicle; and an immobilizer provided in a vehicle, wherein the memory media includes: a memory unit storing user identification data being indicative of the person demanding permission to utilize the vehicle; and a communication unit for wirelessly transmitting the user identification data to the immobilizer, and the immobilizer includes: communication means for receiving the user identification data from the memory media; user identification data storing means for storing user identification data being indicative of a registered user having permission to utilize the vehicle; identifying means for judging whether or not the person is identical to the registered user on the basis of the comparison between the user identification data received from the memory media and the user identification data stored in the user identification data storing means; driving state detecting means for detecting whether the vehicle is in a traveling state, or in a stopped state; and locking and unlocking means for controlling a gear shifter provided in the vehicle on the basis of the judgment of the identifying means, the locking and unlocking means being adapted to assume two different operation states including a locking state to lock the gear shifter to prevent the gear shifter from being shifted from a neutral state or a parking state when the judgment is made that the person is identified as the unregistered user under the condition that the vehicle is in the stopped state, and an unlocking state to unlock the gear shifter to allow the gear shifter to be shifted from a neutral state or a parking state when the judgment is made that the person is identified as the registered user under the condition that the vehicle is in the stopped state.

The anti-theft apparatus thus constructed as previously mentioned can prevent the vehicle from being stolen or improperly utilized, even if the vehicle is temporarily parked with its engine idling, or with its air conditioner running, the user being not in the vicinity of the vehicle, or in the vehicle, by reason that the locking and unlocking means is adapted to prevent the gear shifter from being shifted from the neutral state or the parking state when the driver is not in the vicinity of the vehicle, and to allow the gear shifter to be shifted from the neutral state or the parking state when the driver is identified as the registered user on the basis of the comparison between the user identification data received from the identification card and the user identification data stored in the user identification data storing means.

In the anti-theft apparatus according to the present invention, the locking and unlocking means may be adapted to control a parking brake lever provided in the vehicle on the basis of the judgment of the identifying means. The locking and unlocking means may be adapted to lock the parking brake lever to prevent the parking brake lever from being changed from a braking state when the judgment is made that the person is identified as the unregistered user under the condition that the vehicle is in the stopped state, and to unlock the parking brake lever to allow the parking brake lever to be changed from the braking state when the judgment is made that the person is identified as the registered user under the condition that the vehicle is in the stopped state.

The anti-theft apparatus thus constructed as previously mentioned can prevent the vehicle from being stolen or improperly utilized, even if the vehicle is temporarily parked with its engine idling, or with its air conditioner running, the user being not in the vicinity of the vehicle, or in the vehicle, by reason that the locking and unlocking means is adapted to lock the parking brake lever to prevent the parking brake lever from being changed from the braking state when the driver is not in the vicinity of the vehicle, and to allow the parking brake lever to be changed from the braking state when the driver is identified as the registered user on the basis of the comparison between the user identification data received from the identification card and the user identification data previously registered.

In the anti-theft apparatus according to the present invention, the locking and unlocking means may be adapted to prevent an ignition key from being taken out from a slot of a key cylinder provided in the vehicle when the judgment is made that the person is identified as the unregistered user under the condition that the vehicle is in the stopped state, and to prevent the ignition key inserted in a slot of the key cylinder from being pivotally moved with respect to the key cylinder when the judgment is made that the person is identified as the unregistered user under the condition that the vehicle is in the stopped state. The locking and unlocking means may be adapted to allow the ignition key to be taken out from the slot of the key cylinder when the judgment is made that the person is identified as the registered user under the condition that the vehicle is in the stopped state, to allow the ignition key inserted in the slot of the key cylinder to be pivotally moved with respect to the key cylinder when the judgment is made that the person is identified as the registered user under the condition that the vehicle is in the stopped state.

The anti-theft apparatus thus constructed as previously mentioned can prevent the vehicle from being stolen or improperly utilized, even if the vehicle is temporarily parked with its engine idling, or with its air conditioner running, the user being not in the vicinity of the vehicle, or in the vehicle, by reason that the locking and unlocking means is adapted to lock the ignition key to prevent the ignition key from being angularly moved with respect to the key cylinder when the driver is not in the vicinity of the vehicle, and to allow the ignition key to be angularly moved with respect to the key cylinder when the driver is identified as the registered user on the basis of the comparison between the user identification data received from the identification card and the user identification data previously registered.

In the anti-theft apparatus according to the present invention, the identifying means may be adapted to assume two different operation states including an active state to be operative to judge whether or not the person is identical to the registered user, and an inactive state to be inoperative to judge whether or not the person is identical to the registered user. The immobilizer may further include operation state setting means for having the identifying means selectively assume the active and inactive states. The locking and unlocking means may be adapted to selectively assume the locking and unlocking states on the basis of the judgment of the identifying means when the operation state setting means sets the identifying means to the active state.

The anti-theft apparatus thus constructed as previously mentioned can allow the vehicle to be utilized by the person identified as the registered user without the judgment of the identifying means by having the locking and unlocking means assume the unlocking state when the vehicle is temporarily stopped at a red light, or the person identified as the registered user is in the vehicle.

EFFECTIVENESS OF THE INVENTION

In accordance with the present invention, there is provided an anti-theft apparatus which can prevent the vehicle from being stolen or improperly utilized even if the vehicle is temporarily parked with its engine idling, the user being not in the vicinity of the vehicle, or in the vehicle.

EXPLANATION OF THE REFERENCE NUMERALS

Figure 1:
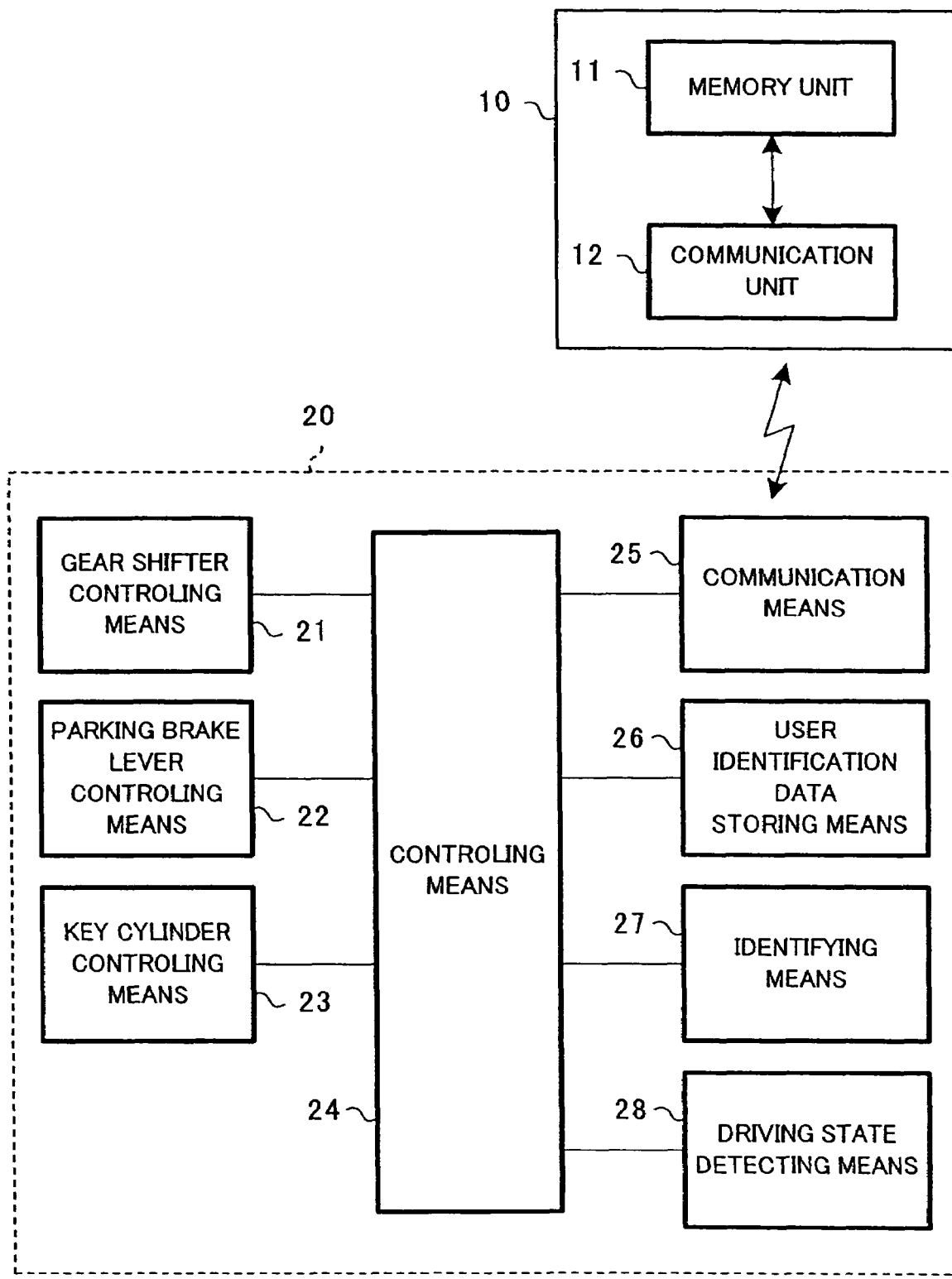
FIG. 1 is a block diagram showing a constitution of the anti-theft apparatus according to the first embodiment of the present invention.

10 identification card (identification data memory media)
11 memory unit
12 communication unit
21 gear shifter controlling means (locking and unlocking means)
22 parking brake lever controlling means (locking and unlocking means)
23 key cylinder controlling means (locking and unlocking means)
24 controlling means (locking and unlocking means)
26 identification data storing means
27 identifying means
28 driving state detecting means
31 identification mode switch (identification mode setting means)

DESCRIPTION OF THE PREFERRED EMBODIMENTS

The preferred embodiments of the anti-theft apparatus according to the present invention will now be described hereinafter in accordance with accompanying drawings.

Figure 2:
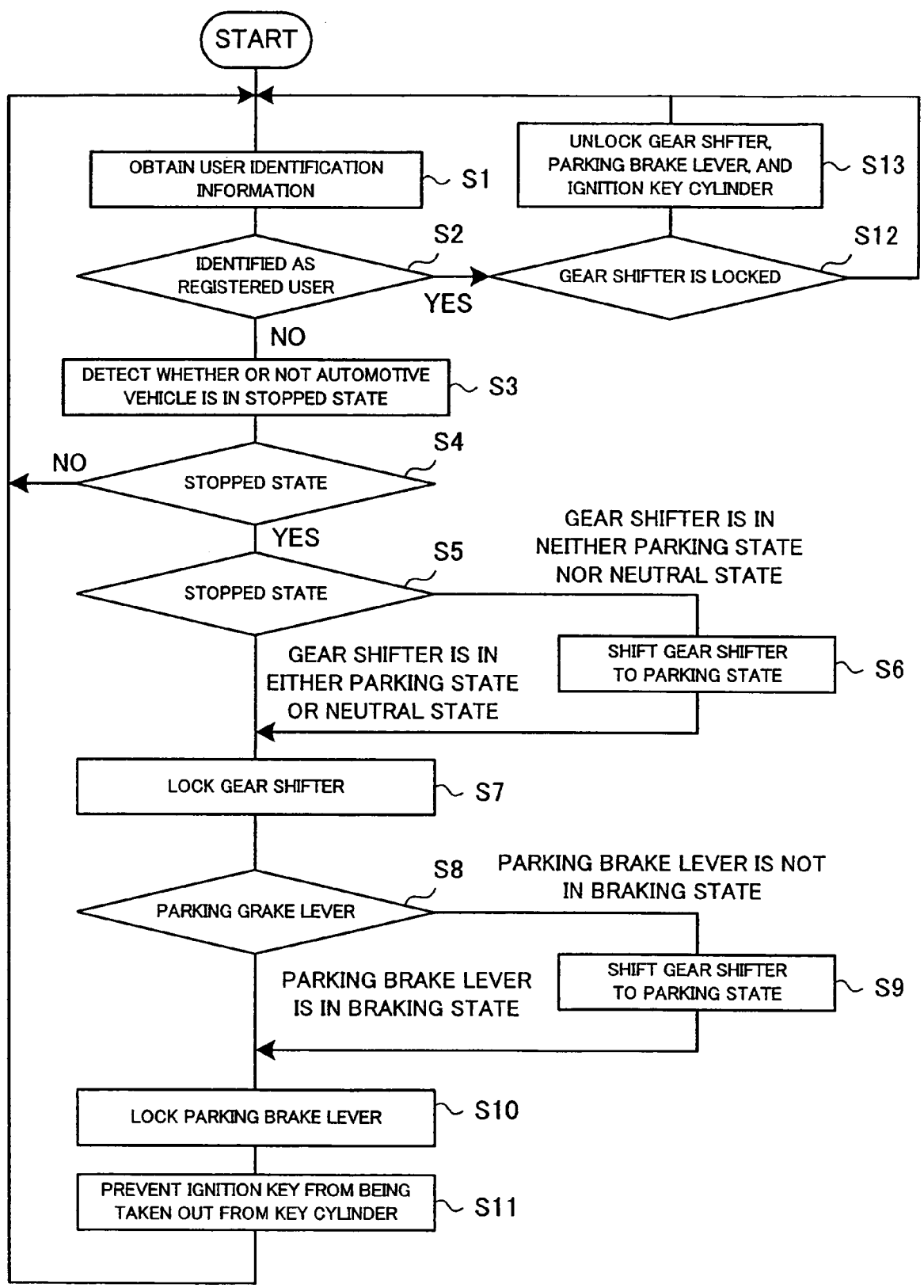
FIG. 2 is a flowchart showing an operation of the anti-theft apparatus according to the first embodiment of the present invention.

FIG. 1 is a block diagram showing a constitution of the anti-theft apparatus according to the first embodiment of the present invention. FIG. 2 is a flowchart showing an operation of the anti-theft apparatus according to the first embodiment of the present invention.

The constitution of the anti-theft apparatus according to the first embodiment of the present invention will be described hereinafter with reference to FIG. 1. The anti-theft apparatus is shown in FIG. 1 as comprising an identification card (identification data memory media) 10 to be carried by a person demanding permission to utilize a vehicle, and an immobilizer 20 provided in the vehicle.

The identification card 10 is constituted by a radio frequency identification (RF-ID) tag and other elements. The identification card 10 includes a memory unit 11 which stores user identification data (hereinafter referred to as "ID data") being indicative of the person demanding permission to utilize the vehicle, and a communication unit 12 for wirelessly transmitting the ID data to the immobilizer 20. Here, the communication unit 12 may start to transmit the ID data to the immobilizer 20 while wirelessly receiving an electric power from the immobilizer 20. The identification card 10 may have a built-in battery, while the communication unit 12 may be adapted to receive an electric power from the built-in battery, and to transmit the ID data to the immobilizer 20 by using the electric power received from the built-in battery.

On the other hand, the immobilizer 20 includes gear shifter controlling means 21, parking brake lever controlling means 22, key cylinder controlling means 23, controlling means 24, communication means 25, user identification data storing means 26, identifying means 27, and driving state detecting means 28.

When the person carrying the identification card 10 is in the vicinity of the vehicle, in other words, within communication range, the communication means 25 of the immobilizer 20 is adapted to perform communication with the identification card 10 during periodic intervals to receive the ID data stored in the memory unit 11 of the identification card 10 from the identification card 10. The user identification data storing means 26 stores ID data being indicative of the user previously registered as a driver. The identifying means 27 is adapted to judge whether or not the person is identical to the previously registered driver on the basis of the comparison between the ID data received from the identification card 10 and the ID data stored in the user identification data storing means 26.

The controlling means 24 is adapted to control the gear shifter controlling means 21, parking brake lever controlling means 22, and key cylinder controlling means 23 on the basis of the judgment made by the identifying means 27 and the judgment made by the driving state detecting means 28.

When the communication means 25 does not establish the communication with the identification card 10, the controlling means 24 is adapted to judge that the identification card 10 carried by the person is outside of communication range.

The driving state detecting means 28 is adapted to detect whether the gear shifter is in either a parking state or a neutral state, or in neither the parking state or the neutral state, or detect whether the vehicle is in a traveling state or in a stopped state on the basis of the judgment made on whether or not the parking brake lever is in a braking state. Here, the driving state detecting means 28 may be adapted to detect whether the vehicle is in the traveling state or in the stopped state on the basis of not only the judgment made on whether or not the parking brake lever is in a braking state, but also a traveling speed and an angle of an accelerator pedal.

When the judgment is made by the identifying means 27 that the person is not identical to the registered user, or the judgment is made by the controlling means 24 that the communication is not established between the identification card 10 and the immobilizer 20 under the condition that the judgment is made by the driving state detecting means 28 that the vehicle is in the stopped state, the controlling means 24 is adapted to issue a locking state setting instruction to each of the gear shifter controlling means 21, the parking brake lever controlling means 22, and the key cylinder controlling means 23.

The gear shifter controlling means 21 is adapted to assume a locking state to prevent the gear shifter from being shifted from the parking state or the neutral state by locking the gear shifter in response to the locking state setting instruction issued by the controlling means 24, and to prevent the vehicle from assuming the traveling state. As a method of locking the gear shifter, the gear shifter may be mechanically locked by the gear shifter controlling means 21 in response to the locking state setting instruction issued by the controlling means 24. The gear shifter controlling means 21 may be adapted to prevent an operation button of the gear shifter from being improperly operated by the suspicious person. The gear shifter controlling means 21 may be adapted to prevent the gear shifter from being shifted from the parking state or the neutral state by locking the gear shifter.

The parking brake lever controlling means 22 is adapted to assume a locking state to lock the parking brake lever to prevent the parking brake lever from being changed from the braking state in response to the locking state setting instruction issued by the controlling means 24, and to prevent the vehicle from assuming the traveling state. As a method of locking the parking brake lever, the parking brake lever controlling means 22 may be adapted to prevent the vehicle from assuming the traveling state by rolling up a brake cable. Here, the function of an unlocking button of the parking brake lever may be disabled in response to the locking state setting instruction issued by the controlling means 24, or the unlocking button of the parking brake lever may be locked on the basis of other method.

The key cylinder controlling means 23 is adapted to assume a locking state to lock the ignition key to prevent the ignition key from being taken out from a slot of the key cylinder, without being affected by the operation of an unlocking button of the key cylinder, in response to the locking state setting instruction issued by the controlling means 24, and to prevent the ignition key inserted in the slot of the key cylinder from being pivotally moved with respect to the key cylinder in response to the locking state setting instruction issued by the controlling means 24 in order to prevent the vehicle from being stolen or improperly utilized. Here, the ignition key inserted in the slot of the key cylinder may be prevented from being taken out from a slot of the key cylinder on the basis of other method.

When, on the other hand, the judgment is made by the identifying means 27 that the person is identical to the registered user on the basis of the comparison between the ID data received from the identification card 10 and the ID data stored in the user identification data storing means 26, the controlling means 24 is adapted to issue an unlocking state setting instruction to each of the gear shifter controlling means 21, the parking brake lever controlling means 22, and the key cylinder controlling means 23.

The gear shifter controlling means 21 assumes the unlocking state to unlock the gear shifter in response to the unlocking state setting instruction issued by the controlling means 24 to allow the gear shifter to be shifted from the parking state or the neutral state. The parking brake lever controlling means 22 assumes a unlocking state to unlock the parking brake lever in response to the unlocking state setting instruction issued by the controlling means 24 to allow the parking brake lever to be changed from the braking state. The key cylinder controlling means 23 assumes the unlocking state to unlock the releasing button to allow the ignition key to be taken out from the slot of the key cylinder, and allow the ignition key inserted in the slot of the key cylinder to be pivotally moved with respect to the key cylinder. The ignition key inserted in the slot of the key cylinder assumes the ignition state to start the engine of the vehicle when the ignition key inserted in the slot of the key cylinder is angularly moved with respect to the key cylinder by a specific angle. In this embodiment, the gear shifter controlling means 21, the parking brake lever controlling means 22, the key cylinder controlling means 23, and the controlling means 24 collectively constitute locking and unlocking means.

The operation of the controlling means 24 of the anti-theft apparatus according to the second embodiment of the present invention will be then described hereinafter with reference to FIG. 2.

In the anti-theft apparatus according to the second embodiment of present invention, the communication is firstly performed between the communication means 25 of the immobilizer 20 and the identification card 10 which is being carried by the driver. The ID data is received from the identification card 10 which is being carried by the driver (in the step S1). The judgment is then made by the controlling means 24 (in the step S2) on whether or not the driver carrying the identification card 10 is identical to the registered user on the basis of the comparison between the ID data received from the identification card 10 and the ID data stored in the user identification data storing means 26.

When the judgment is made in the step S2 that the driver is not identical to the registered user, the judgment is made by the driving state detecting means 28 (in the step S3) on whether or not the gear shifter is in either the parking state or the neutral state, or whether or not the parking brake lever is in the braking state. The judgment is then made (in the step S4) on whether the vehicle is in the traveling state or in the stepped state.

When the judgment is made in the step S4 that the vehicle is in the stopped state, the judgment is made by the driving state detecting means 28 (in the step S5) on whether or not the gear shifter is in either the parking state or the neutral state. When the judgment is made in the step S5 that the gear shifter is in neither the parking state nor the neutral state, the gear shifter controlling means 21 locks the gear shifter after having the gear shifter shift to the parking state (in the step S6). The anti-theft apparatus according to the second embodiment of the present invention prevents the vehicle from being improperly utilized by the driver identified as the unregistered user (in the step S7). As a method of having the gear shifter assume the parking state, the gear shifter may be shifted by an actuator, or other driving means.

When the judgment is made in the step S5 that the gear shifter is in either the parking state or the neutral state, the gear shifter controlling means 21 locks the gear shifter to prevent the gear shifter from being shifted from the current operation state (in the step S7).

The judgment is then made (in the step S8) on whether or not the parking brake lever is in the braking state. When the judgment is made in the step S8 that the parking brake lever is not in the braking state, the parking brake lever controlling means 22 has the parking brake lever assume the braking state by rolling up the brake cable (in the step S9). The parking brake lever controlling means 22 assumes the locking state to lock the parking brake lever to prevent the parking brake lever from being changed from the braking state in response to the locking state setting instruction issued by the controlling means 24 (in the step S10).

When the judgment is made in the step S8 that the parking brake lever is in the braking state, the parking brake lever controlling means 22 assumes the locking state to lock the parking brake lever to prevent the parking brake lever from being changed from the braking state (in the step S9).

The key cylinder controlling means 23 is then operated to assume the locking state to prevent the ignition key inserted in the slot of the key cylinder from being taken out from the slot of the key cylinder provided in the vehicle (in the step S11). The procedure proceeds to the step S1. When, on the other hand, the judgment is made in the step S2 that the ID data received from the identification card is the same as the ID data stored in the user identification data storing means 26, in other words, the person is identified as the unregistered user, the judgment is made (in the step S12) on whether or not each of the gear shifter, the parking braking lever, and the key cylinder is in the locked state. When the judgment is made in the step S12 that each of the gear shifter, the parking braking lever, and the key cylinder is in the locked state, controlling means 24 has each of the gear shifter controlling means 21, the parking brake lever controlling means 22, and the key cylinder controlling means 23 assume the unlocking state (in the step S13). The procedure proceeds to the step S1.

From the above detailed description, it will be understood that the anti-theft apparatus according to the first embodiment of the present invention can prevent the vehicle from being utilized or stolen by a person identified as an unregistered user, even if the vehicle is temporarily parked with its engine idling, or with its air conditioner adjusting an indoor temperature, or maintaining a comfortable indoor temperature, the user being not in the vicinity of the vehicle, or in the vehicle, by reason that the gear shifter controlling means 21 is adapted to prevent the gear shifter from being shifted from the parking state or the neutral state by locking the gear shifter when the judgment is made that the user to be identified as the registered user is not in the vicinity of the vehicle, the parking brake lever controlling means 22 is adapted to prevent the parking brake lever from being changed from the braking state by locking the parking brake lever when the judgment is made that the user to be identified as the registered user is not in the vicinity of the vehicle, and the key cylinder controlling means 23 is adapted to prevent the ignition key from being taken out from the slot of the key cylinder, and to prevent the ignition key inserted in the slot of the key cylinder from being pivotally moved with respect to the key cylinder when the judgment is made that the user to be identified as the registered user is not in the vicinity of the vehicle.

The anti-theft apparatus according to the first embodiment of the present invention can allow the vehicle to be utilized by the driver identified as the registered user by reason that the gear shifter controlling means 21 is adapted to allow the gear shifter to be shifted from the parking state or the neutral state by unlocking the gear shifter when the judgment is made that the driver is identical to the registered user on the basis of the comparison between the ID data received from the identification card 10 and the ID data stored in the user identification data storing means 26 of the immobilizer 20, the parking brake lever controlling means 22 is adapted to allow the parking brake lever to be changed from the braking state by unlocking the parking brake lever when the judgment is made that the driver is identical to the registered user on the basis of the comparison between the ID data received from the identification card 10 and the ID data stored in the user identification data storing means 26 of the immobilizer 20, and the key cylinder controlling means 23 is adapted to allow the ignition key to be taken out from the slot of the key cylinder, and to allow the ignition key inserted in the slot of the key cylinder to be pivotally moved with respect to the key cylinder when the judgment is made that the driver is identical to the registered user on the basis of the comparison between the ID data received from the identification card 10 and the ID data stored in the user identification data storing means 26 of the immobilizer 20. In other words, the anti-theft apparatus according to the first embodiment of the present invention can prevent the vehicle from being stolen or improperly utilized by a person identified as an unregistered user even if the vehicle is temporarily parked with its engine idling, the driver being not in the vicinity of the vehicle, or in the vehicle.

Even if the vehicle is improperly moved by an identified person under the condition that the driver identified as the registered user is in the vicinity of the vehicle, the anti-theft apparatus according to the second embodiment of the present invention can prevent the vehicle from being stolen by the identified person by reason that the gear shifter controlling means 21 is adapted to have the gear shifter shift to the parking state or the neutral state immediately if the vehicle is temporarily stopped.

Figure 3:
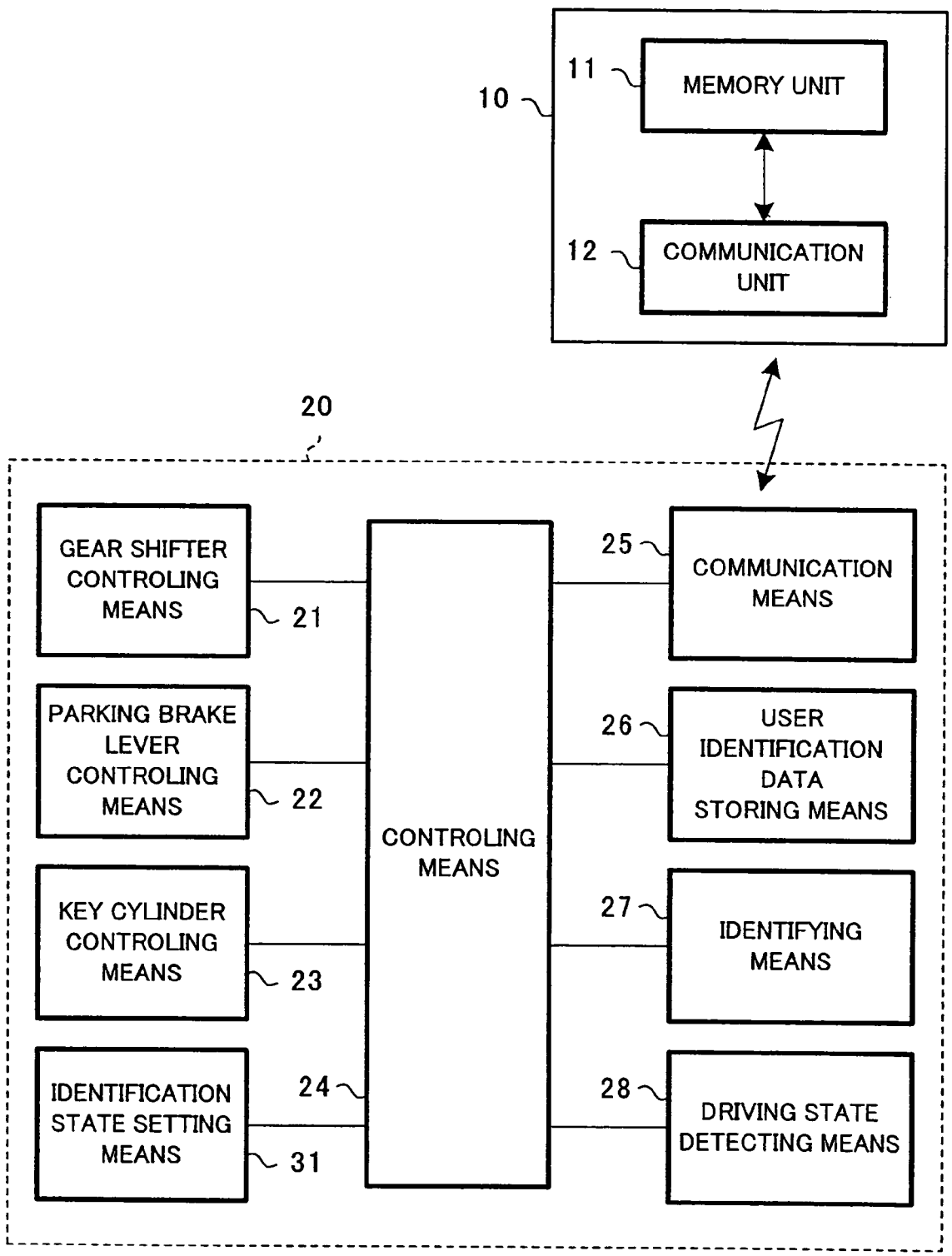
FIG. 3 is a block diagram showing a constitution of the anti-theft apparatus according to the second embodiment of the present invention.
Figure 4:
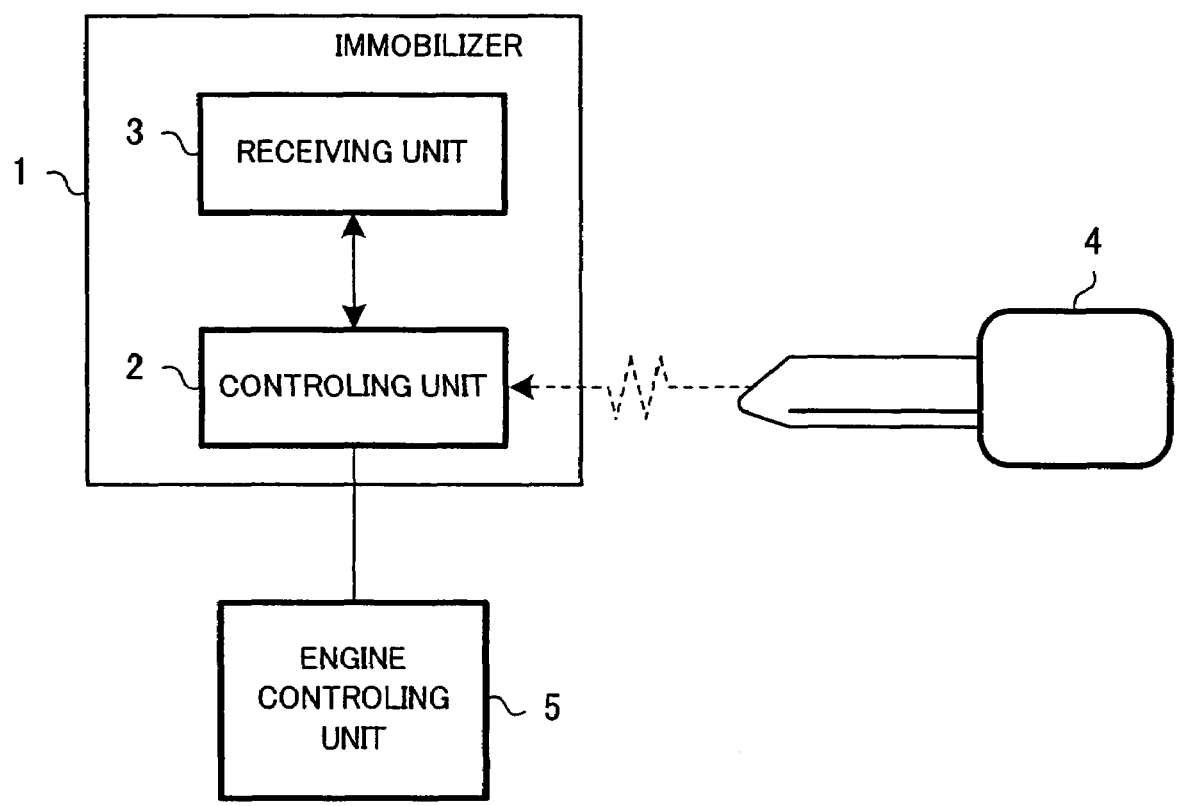
FIG. 4 is a block diagram showing a conventional anti-theft apparatus.

FIG. 3 is a block diagram showing the constitution of the anti-theft apparatus according to the second embodiment of the present invention. The anti-theft apparatus is shown in FIG. 1 as comprising an identification card (memory media) 10 to be carried by a driver demanding permission to utilize a vehicle, and an immobilizer 20 provided in the vehicle. The anti-theft apparatus according to the second embodiment is the same in construction as the anti-theft apparatus according to the first embodiment with the exception that the immobilizer 20 according to the second embodiment further includes an identification mode switch (operation state setting means) 31 for having the identifying means 27 selectively assume an active state and an inactive state. Therefore, the constitutional elements of the second embodiment of the anti-theft apparatus the same as those of the first embodiment of the anti-theft apparatus will not be described but bear the same reference numerals as those of the first embodiment of the anti-theft apparatus.

The identifying means 27 is adapted to assume two different operation states including an active state to be operative to judge whether or not the person is identical to the registered user under the condition that the vehicle is in the stopped state, and an inactive state to be inoperative to judge whether or not the person is identical to the registered user under the condition that the vehicle is in the stopped state. The immobilizer 20 further includes an identification mode switch (operation state setting means) 31 for having the identifying means 27 selectively assume the active state and the inactive state. When the identification mode switch 31 has the identifying means 27 assume the active state, the controlling means 24 is adapted to control each of the gear shifter controlling means 21, the parking brake lever controlling means 22, and key cylinder controlling means 23 on the basis of the judgment of the identifying means 27. When, on the other hand, the identification mode switch 31 has the identifying means 27 assume the inactive state, the controlling means 24 is adapted to prevent each of the gear shifter controlling means 21, the parking brake lever controlling means 22, and key cylinder controlling means 23 from assuming the locking state.

From the above detailed description, it will be understood that the anti-theft apparatus according to the second embodiment of the present invention can allow the vehicle to be continuously utilized without the judgment of the identifying means 27 when, for example, the vehicle is temporarily stopped at a light, and the driver identified as the registered user is in the vehicle, by reason that the immobilizer 20 further includes an identification mode switch 31 for having the identifying means 27 assume the inactive mode, even if the vehicle is being temporarily stopped at a red light, when the driver identified as the registered user is in the vehicle.

In the anti-theft apparatus according to the second embodiment of the present invention, the communication means 25 of the immobilizer 20 is adapted to wirelessly receive the ID data of the driver from the identification card 10. However, the communication means 25 may be adapted to wirelessly receive the ID data of the driver from a mobile phone or an remote controller.

INDUSTRIAL APPLICABILITY OF THE PRESENT INVENTION

As will be seen from the foregoing description, the present invention has an effect of preventing a vehicle from being stolen or improperly utilized even if the vehicle is temporarily parked with its engine idling, and with no driver. The present invention is available as an anti-theft apparatus which can prevent the vehicle from being stolen or improperly utilized even if the vehicle is temporarily parked with its engine idling, and with no driver.

What is claimed is:

1. An anti-theft apparatus, comprising: memory media to be carried by a person demanding permission to utilize a vehicle; and an immobilizer provided in said vehicle, wherein
    said memory media includes: a memory unit storing user identification data being indicative of said person demanding permission to utilize said vehicle; and a communication unit for wirelessly transmitting said user identification data to said immobilizer, and
    said immobilizer includes: communication means for receiving said user identification data from said memory media; user identification data storing means for storing user identification data being indicative of a registered user having permission to utilize said vehicle; identifying means for judging whether or not said person is identical to said registered user on the basis of the comparison between said user identification data received from said memory media and said user identification data stored in said user identification data storing means; driving state detecting means for detecting whether said vehicle is in a traveling state, or in a stopped state; and locking and unlocking means for controlling a gear shifter provided in said vehicle on the basis of the judgment of said identifying means, said locking and unlocking means being adapted to assume two different operation states including a locking state to lock said gear shifter to prevent said gear shifter from being shifted from a neutral state or a parking state when the judgment is made that said person is identified as said unregistered user under the condition that said vehicle is in said stopped state, and an unlocking state to unlock said gear shifter to allow said gear shifter to be shifted from a neutral state or a parking state when the judgment is made that said person is identified as said registered user under the condition that said vehicle is in said stopped state.

2. An anti-theft apparatus as set forth in claim 1, in which
said identifying means is adapted to assume two different operation states including an active state to be operative to judge whether or not said person is identical to said registered user, and an inactive state to be inoperative to judge whether or not said person is identical to said registered user, in which said immobilizer further includes operation state setting means for having said identifying means selectively assume said active and inactive states, and in which said locking and unlocking means is adapted to selectively assume said locking and unlocking states on the basis of the judgment of said identifying means when said operation state setting means sets said identifying means to said active state.

3. An anti-theft apparatus as set forth in claim 1, in which
said locking and unlocking means is adapted to control a parking brake lever provided in said vehicle on the basis of the judgment of said identifying means, said locking and unlocking means is adapted to lock said parking brake lever to prevent said parking brake lever from being changed from a braking state when the judgment is made that said person is identified as said unregistered user under the condition that said vehicle is in said stopped state, and to unlock said parking brake lever to allow said parking brake lever to be changed from said braking state when the judgment is made that said person is identified as said registered user under the condition that said vehicle is in said stopped state.

4. An anti-theft apparatus as set forth in claim 3, in which
said identifying means is adapted to assume two different operation states including an active state to be operative to judge whether or not said person is identical to said registered user, and an inactive state to be inoperative to judge whether or not said person is identical to said registered user, in which said immobilizer further includes operation state setting means for having said identifying means selectively assume said active and inactive states, and in which said locking and unlocking means is adapted to selectively assume said locking and unlocking states on the basis of the judgment of said identifying means when said operation state setting means sets said identifying means to said active state.

5. An anti-theft apparatus as set forth in claim 1 or claim 3, in which
said locking and unlocking means is adapted to prevent an ignition key from being taken out from a slot of a key cylinder provided in said vehicle when the judgment is made that said person is identified as said unregistered user under the condition that said vehicle is in said stopped state, and to prevent said ignition key inserted in a slot of said key cylinder from being pivotally moved with respect to said key cylinder when the judgment is made that said person is identified as said unregistered user under the condition that said vehicle is in said stopped state, and in which said locking and unlocking means is adapted to allow said ignition key to be taken out from said slot of said key cylinder when the judgment is made that said person is identified as said registered user under the condition that said vehicle is in said stopped state, to allow said ignition key inserted in said slot of said key cylinder to be pivotally moved with respect to said key cylinder when the judgment is made that said person is identified as said registered user under the condition that said vehicle is in said stopped state.

6. An anti-theft apparatus as set forth in claim 1 or claim 3, in which
said identifying means is adapted to assume two different operation states including an active state to be operative to judge whether or not said person is identical to said registered user, and an inactive state to be inoperative to judge whether or not said person is identical to said registered user, in which said immobilizer further includes operation state setting means for having said identifying means selectively assume said active and inactive states, and in which said locking and unlocking means is adapted to selectively assume said locking and unlocking states on the basis of the judgment of said identifying means when said operation state setting means sets said identifying means to said active state.

\* \* \* \* \*

UNITED STATES PATENT AND TRADEMARK OFFICE
CERTIFICATE OF CORRECTION

PATENT NO. : 7,274,979 B2
APPLICATION NO. : 10/552564
DATED : September 25, 2007
INVENTOR(S) : Norihiro Fujioka It is certified that error appears in the above-identified patent and that said Letters Patent is hereby corrected as shown below:

On the Title Page

At Item (56), References Cited, Foreign Patent Documents, JP 3086831 "4/1991" should read -- 4/2002 --.

At Item (56), References Cited, Foreign Patent Documents, JP 03-120256 "5/1991" should read -- 12/1991 --.

At Item (56), References Cited, Foreign Patent Documents, insert reference -- EP 0879743 11/1998 --.

Signed and Sealed this

Twenty-ninth Day of September, 2009

David J. Kappos
*Director of the United States Patent and Trademark Office*